(12) United States Patent
Basich

(10) Patent No.: US 8,066,797 B2
(45) Date of Patent: Nov. 29, 2011

(54) METHOD OF TREATING METALLIC AND NON-METALLIC BY-PRODUCTS

(76) Inventor: John Basich, Burlington (CA)

( * ) Notice: Subject to any disclaimer, the term of this patent is extended or adjusted under 35 U.S.C. 154(b) by 512 days.

(21) Appl. No.: 11/398,671

(22) Filed: Apr. 6, 2006

(65) Prior Publication Data

US 2006/0260438 A1     Nov. 23, 2006

Related U.S. Application Data

(60) Provisional application No. 60/668,613, filed on Apr. 6, 2005.

(51) Int. Cl.
*C22B 9/00*        (2006.01)

(52) U.S. Cl. ............... 75/581; 75/571; 75/572; 75/573; 75/580

(58) Field of Classification Search ............ 75/746–773, 75/304, 10.1, 10.14–10.18, 10.29, 10.3, 10.32, 75/10.33, 10.46–10.63, 10.65, 10.66, 392, 75/401, 414, 433, 441, 458–472, 500–504, 75/507–584, 957; 148/513, 514, 559, 579; 264/37.1, 37.29; 428/544, 546, 548–687; 206/83.5; *B09B 3/00; C22B 9/00*
See application file for complete search history.

(56) References Cited

U.S. PATENT DOCUMENTS

| 14,114 | A | * | 1/1856 | Pevey | 75/304 |
|---|---|---|---|---|---|
| 132,743 | A | * | 11/1872 | Whitney | 75/572 |
| 135,512 | A | * | 2/1873 | Bolton, Jr., et al. | 75/441 |
| 140,761 | A | * | 7/1873 | Bolton, Jr. | 75/572 |
| 1,869,925 | A | * | 8/1932 | Turnbull | 75/304 |
| 2,805,146 | A | * | 9/1957 | Howard | 75/304 |
| 2,992,094 | A | * | 7/1961 | Powell et al. | 75/10.43 |
| 4,244,492 | A | | 1/1981 | Beyerstedt et al. | |
| 5,124,214 | A | * | 6/1992 | Cacace | 428/577 |
| 5,855,645 | A | | 1/1999 | Myerson et al. | |
| 6,585,800 | B2 | * | 7/2003 | Sugitatsu et al. | 75/572 |

OTHER PUBLICATIONS

Callister, Jr., William D., Materials Science and Engineering, An Introduction, 6th edition, John Wiley & Sons, 2003. pp. 339-345. (9 pages including front matter).*

* cited by examiner

*Primary Examiner* — Scott Kastler
*Assistant Examiner* — Vanessa Velasquez
(74) *Attorney, Agent, or Firm* — Dowell & Dowell, PC

(57) ABSTRACT

The method of the present invention involves recycling or reprocessing small-sized metallic or non-metallic by-products by enclosing them in a binder prior to melting. The binder can be a steel drum or other suitable steel enclosure. Melting is then accomplished by a cupola.

10 Claims, 4 Drawing Sheets

US 8,066,797 B2

METHOD OF TREATING METALLIC AND NON-METALLIC BY-PRODUCTS

This application claims priority from U.S. Provisional Application 60/668,613 filed Apr. 6, 2005.

FIELD OF INVENTION

This invention relates to an improved method for treating certain metallic and non-metallic units to permit more effective recycling or reprocessing.

BACKGROUND OF THE INVENTION

A significant tonnage of metallic scrap typically enters landfills or is re-directed to other manufacturing sectors because it is unsuitable for reprocessing. To be suitable for cost-effective reprocessing, metallic scrap must meet certain physical criteria relating to size, shape and density. Most common higher quality steel and cast iron scrap includes automotive, plate and structural, shredded steel, foundry grade steel, busheling steel and cold and hot pressed cast iron borings.

Select examples of scrap traditionally not seen as suitable for reprocessing include steel shot fines and dust. Other scrap grades such as cast iron borings/chips and steel turnings have value, but not in an unfinished form. These types of materials often are first pre-processed into briquettes, and then are further reprocessed.

Recycling is often accomplished by melting the scrap material in a cupola, induction furnace, arc or blast furnace. The choice of melting process is partially dictated by the physical properties of the charged scrap in conjunction with the final desired metal chemistry at tap.

Most recently the foundry industry has experienced extreme volatility in terms of availability and pricing for cupola raw materials. As such it has become important to attempt to utilize other types of previously little-utilized raw materials such as steel shot fines/dust or loose borings. These often are not easily reprocessed due to problems with the melting process caused by their shape or small size.

The sizing distribution for these little-utilized raw material grades are commonly ½" or less, and in some instances measuring finer than minus 70 mesh (−70M).

When scrap is this excessively small a variety of detrimental process conditions are created such as:

(a) handling issues,
(b) metal yields,
(c) reduced melt rates, and
(d) recovery rates.

Handling

Handling issues will arise since it is not practical to transport raw materials ranging in size from ½" by down in the loose shape or form (i.e., as -produced condition). One can expect a reduction in metallic yield due to losses in transport, both upon delivery and on-site movements, and quite possibly due to inclement weather during storage such as high winds.

To offset these issues it will be necessary to pre-package the material in possibly super sacs, bins, totes or boxes. This will only augment costs and the need for more storage space and frequency of material movement. This implies that these raw materials in their as-produced condition are too unmanageable for efficient charging and melting in a cupola.

Yield Losses

Further metallic losses are expected upon cupola charging. It is observed that as loose fines/chips descend down the cupola stack the exiting top gases will re-direct some of the scrap material to the air pollution control system. Not only does this have a direct impact on metallic yield but it simultaneously promotes higher maintenance and disposal costs.

Reduced Melt Rates

As fines/chip-sized scrap descends down the cupola stack they tend to fill in the voids between the larger-sized scrap promoting a bridging effect. This restricts the upward gas flow and consequently increases the wind-box back pressure. If this occurs it may be necessary to reduce the blast volume to alleviate the condition—which in turn reduces metal output.

Recovery Rates

Sizing and surface area are interrelated. It is an inverse relationship. As the sizing decreases, the surface area increases. This characteristic normally promotes higher oxidation losses which causes a reduction in metallic recovery rates.

The past technology trend to alleviate the above identified pitfalls associated with small-sized scrap (i.e., in loose shape or form) has been to reshape or repackage the scrap, primarily by a process termed briquetting. The prior art teaches two main methods for briquetting—hot/cold pressed briquettes, and bonded briquettes.

Hot/Cold Briquettes

Metallurgically speaking there are essentially three (3) grades or families of cast iron; namely, gray, malleable and ductile. The borings from these respective grades are normally hot or cold pressed to form a briquette shape. Borings are simply machining fragments from the castings. The fragments themselves appear as metallic chips either in the wet or dry state dependent on the machine shop's tooling practice.

One ideally prefers to process dry borings since no cost is attached for the removal of the water and oil coolants. The mechanical/physical properties of the two briquetting techniques are quite polarized. The cold pressed briquettes yield an inferior product since the briquettes are much weaker and tend to deteriorate causing both high handling and melting losses. In the hot pressed briquetting process, the borings are elevated from ambient temperature to levels as high as 1500°F. It is quite possible at this elevated temperature to oxidize the carbon, silicon and iron elements if a proper reducing atmosphere is not maintained. At this temperature the borings are softened to promote a dense and strong briquette bond that will not deteriorate during handling. Overall, the hot pressed briquette is more desirable.

Bonded Briquettes

Certain raw materials such as steel shot fines/dust are not conducive to hot or cold-pressed process due to their physical properties. In order to re-shape or re-package this type of material a "bonding agent" is required. Bonding agents are normally cement or possibly some chemical compound such as Sodium Silicate ($Na_2SiO_3$). Regardless of the type of bond, the metallic units will be diluted. Depending on the final briquette shape in conjunction with the raw material sizing, as much as eleven percent by weight of binder may be required to provide an adequate bond for handling without promoting deterioration or spalling. This results in eleven percent by weight of non-metallic units being blended into the briquette, and consequently the total percentage of metallic units is similarly reduced.

Briquetting assists with the previously set-out drawbacks of charging excessively small raw materials in the loose or as-produced condition into a cupola; namely, handling, metal yield, reduced melt rate, and recovery rates. The impact of briquetting on these noted concerns is as follows:

Handling

Both the hot pressed and bonded briquettes are extremely dense and packaged in a more manageable shape. This neutralizes the "handling" concerns such as storage space, movement frequency, pre-packaged costs and losses while in transport and held in inventory.

Metal Yield

No fines/chips are extracted/exhausted during charging into the pollution control system. Once again this is due to the density and shape of the charged product.

Reduced Melt Rate

As the briquette descends down the preheat segment of the cupola stack its shape is maintained. This condition eliminates any fines/chips from bridging (i.e., filling the voids and restricting upward gas flow) consequently leading to high back pressures and eventual blast reduction which promotes a loss of metal output.

The cold pressed briquettes perform similarly to the hot pressed briquettes except not to the same level of excellence since as noted earlier they are not quite as strong. Therefore, one can expect some continued handling losses and spalled-off segments of metallics being re-directed to the pollution system.

Recovery Rates

As a hot pressed or bonded briquette descends down the preheat zone of the cupola, it will eventually breakdown due to higher internal temperatures plus the stack burden above. For example consider the binder (i.e., cement or sodium silicate) portion that holds the bonded briquette together. The melting point of the binder is slightly less than 2000°F. which implies that it will begin to breakdown just above the "melt zone" in the cupola.

As the binder deteriorates the briquette reverts back towards its original shape (½"×down) and density. In this form the metallic units of the scrap are more prone to oxidizing due to an increase in surface area and direct contact with the upward flowing oxidizing gases.

In summation, the prior art method of briquetting enhances the recovery rate when compared to charging loose/fine raw materials; however, it does not approach the same levels as a single large piece of scrap such as a cast iron rotor or plate and structural.

There are several other miscellaneous yet important drawbacks associated with the briquetting of small sized raw materials in order to make it suitable for charging.

Rust Formation

Another important drawback applicable to both briquetted scrap and the more common scrap grades is the potential formation of "red rust". This is difficult to eliminate as in most cases the material is stored outside at the suppliers end and is also exposed to the elements during both transport and while stored externally in inventory. The formation of rust simply means a loss of metallic yield or recovery even before one starts to process the material.

Flexibility

There are physical constraints to the number of different raw materials one can blend into a single briquette. For example, if there is a desire to briquette cast iron borings plus steel shot fines plus possibly a few alloy products such as ferrosilicon fines, and silicon carbide grain, then multiple briquette grades must be manufactured. It may be possible to blend a small percentage by weight of some non-metallic and/or metallic alloy to the main blend component of the briquette but it will be very limited. Differences in physical properties plus a limited space to charge an excessive number of different raw material components into the same briquette leads to an unstable product in terms of strength and chemical consistency.

Charge Weight Variability

Another important drawback applicable to both briquetted scrap and the more common scrap grades is the charge weight variability when charging the cupola. Most steel scrap is magnet-batched and it is not uncommon to observe charge weight variability in the order of plus/minus 50 to 500 pounds relative to a pre-set charge weight. Higher metal input variability obviously leads to higher metal output variability.

OBJECTS OF THE INVENTION

It is therefore an object of the present invention to provide a method of treating metallic and non-metallic units/by-products of relatively small dimensions in a way that eliminates many of the drawbacks of the briquetting method itemized above.

SUMMARY OF THE INVENTION

The method of the present invention involves recycling or reprocessing small-sized metallic or non-metallic by-products by enclosing them in a binder prior to melting. The binder can be a steel drum or other suitable steel enclosure. Melting is then accomplished by a cupola.

BRIEF DESCRIPTION OF THE DRAWINGS

The apparatus of the invention will now be described with reference to the accompanying drawings, in which.

DETAILED DESCRIPTION OF THE INVENTION

Figure 1:
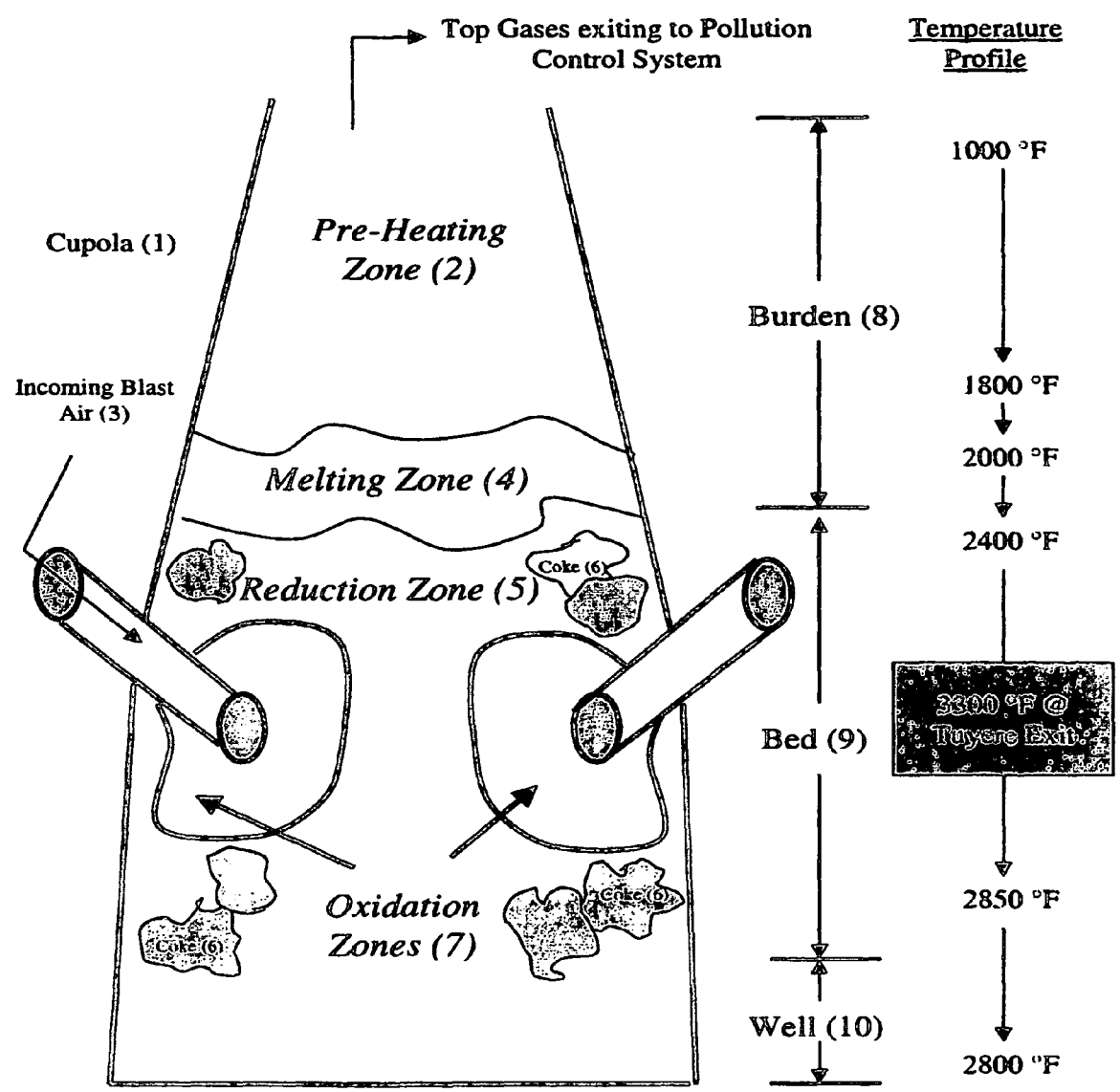
FIG. 1 is a cross-sectional view of a cupola melting unit.

In order to more clearly understand the present invention part numbers as assigned in the following parts list will be used:

Part Number Description

1 Cupola
2 Pre-heating Zone
3 Incoming Blast Air
4 Melting Zone
5 Reduction Zone
6 Coke
7 Oxidation Zones
8 Burden
9 Bed
10 Well
11 Lid
12 Binder (Steel Drum)
13 Folded Drum Top
14 Hydraulic Press
15 Crushed Drum
16 Top of Crushed Drum The method of the present invention involves enclosing the small-sized steel by-products in a steel binder prior to melting. As mentioned earlier melting in the Foundry Industry is commonly accomplished by a cupola but can be also effected by a furnace, such as an induction furnace, arc or blast furnace.

The simplest and most common steel binder for illustrative purposes to consider is a steel drum. The sizing of the drum can vary from a paint can size to a typical 45-Imperial Gallon drum (i.e., equivalent to a 55-US Gallon drum) or any other size in between. Financial gains are realized by utilizing the larger size.

The benefits, again related to some of the previously described issues, are as follows:

Metallic Units

Since the binder is steel, the metallic units of the finished product actually increase. The same cannot be said regarding the bonded briquettes.

Proprietary Blend-Mix

Most cupola operations can tolerate the larger sized 45-Imperial Gallon drums if properly prepared. This implies significant volume increase availability for charging not only individual raw material scrap but multiple grades if so desired. For example, a single steel binder container consisting of 400 pounds of loose cast iron borings, plus 170 pounds of steel shot fines/dust, plus 25 pounds of 90% silicon carbide grain and 20 pounds of coke breeze, is well within the capability of this process. This provides the end user with the ability to create proprietary blend-mixes since the finished product will weigh in the order of 615 pounds (i.e., excluding the actual steel binder container and cover weight) compared to non-steel binder briquettes weighing only five (5) to ten (10) pounds.

Handling

Minimal magnetic crane movements and storage space are required due to the extremely high density and weight attached to this form of packaging.

Elimination of Rust Formation

The contents stored within the covered steel containers will not be exposed to the external elements thus promoting the elimination or significant retardation of rust formation. Only the steel drum's external surface will oxidize which is also observed with all the other mentioned scrap grades regardless of size and shape. Even this small amount of oxidation can be eliminated or avoided by utilizing a steel drum/container coated with paint.

Metal Yield

For similar reasons noted earlier, by containing the small-sized scrap in a steel binder eliminates any potential fines/chips from being exhausted to the air pollution control system.

Reduced Melt Rate

Scrap fines/chips cannot escape the container and descend downward to fill the voids between the larger scraps charged. Therefore, there are no fears of an increase in back pressure leading to a reduction in melt rate due to lower blast conditions.

Recovery Rates

It is anticipated that significant improvements will be observed regarding this particular attribute. Consider for example the pre-described proprietary blend-mix; namely, a single steel binder container consisting of 400 pounds of loose cast iron borings, plus 170 pounds of steel shot fines/dust, plus 25 pounds of 90% silicon carbide grain and 20 pounds of coke breeze. As the steel container descends through the Pre-Heating Zone, it approaches the Melting Zone which is located just above the Coke Bed. The temperature at the beginning of the Melt Zone normally measures approximately 2000 Fahrenheit as shown in FIG. 1. The external Steel Container becomes higher in temperature than the temperature of the Container's content thereby creating a temperature gradient. As the external steel portion of the container rises in temperature, it will convect this heat internally to the container's content. This is dictated by the laws of physics—heat always travels from hot to cold. In fact, the cupola operation is to a large extent a physical one involving the principles of Heat Transfer.

As this heat is transferred internally, then obviously the temperature of the container's content rises. The cast iron borings portion of the container mix has a eutectic composition (i.e., % Carbon @3.45, % Silicon @2.15%). This implies a melting point of approximately 2150° Fahrenheit—well below the typical melting point of the steel container which measures approximately 2800° Fahrenheit. In other words, the Steel Binder's heat transfer promotes the melting of the borings. As the container continues to descend through the Melt Zone the cupola temperatures rise approaching 2400° Fahrenheit at the beginning of the Reduction Zone.

During this entire process the containers heat transfer to its internal content continues. The cast iron borings and steel shot fines/dust continue to rise in temperature and the Steel Container will remain intact before it eventually breaks down and melts. Since the steel binder deteriorates later in the cupola process and consequently descends further down into the cupola when compared to the previous art method of briquetting, enhanced recovery rates will be realized.

Alloying Flexibility

In the old technology one was limited to the number of raw material components to add to the briquette. No such constraints apply to the steel binder container. One can conservatively add six (6) to seven (7) different raw materials as part of the proprietary blend-mix. These materials can be silicon carbide grain, mill scale, coke breeze, ferrosilicon fines and silvery iron fines can all be charged with cast iron borings and steel shot fines/dust. Since there is no actual mixing but simply charging the raw material into the container, one can capitalize on potential benefits realized by incorporating a specific charging sequence into the container.

Chemical Consistency

One can expect the charge weight variability of the finished product to measure within plus/minus 15 pounds relative to a pre-set charge weight. Since there is no mixing of the raw materials as experienced with bonded briquettes there will be less segregation. Collectively, the above promotes less chemical variability.

Undesirable Fuel Consumption

In the steel binder there is no waste. The binder is a raw material that is made from steel and is of major interest to the melter. When a bonded briquette is processed, the binder is a non-metallic agent. This material must be fluidized in order to facilitate removal from the melting unit in the form of oxides or slag. In order to achieve this one must apply BTU's. If the binder is cement then there will also be approximately four (4) to seven (7) percent by weight of water. Once again, additional BTU's would be required to vaporize the water.

Simulated Lower Charge Weight

Due to its high density, the steel container and its content will occupy less space in the charge bucket. Two effects will be observed due to this attribute. First, a better layering effect is observed inside the cupola, especially in the Pre-Heating Zone. The consequence of this is softer metal as measured by the carbon equivalent. This allows the melting operator to reduce coke usage without sacrificing metal chemistry (i.e., still stay in specification).

The second attribute is the number of charges held in the burden. In one particular cupola operation (i.e., 60 inch diameter cupola), the charge burden increases from 6-charges to 8-charges which represents a thirty-three percent (33%) increase despite maintaining the same charge weight. This enhances the recovery of the waste heat as the upward flowing gases come in contact with the downward flowing charges of metallics and fuel.

Not only do the above observed effects/action reduce costs but will further enhance metal output.

Drum Preparation

Most covers on a 45-Imperial Gallon drum are held in place by either a Lever-Lock Ring or a Ring & Bolt. These are considered to be potential weak points when the finished product is aggressively handled (i.e., magnet-batched and dropped from 10/15 feet in height). With this understanding, benefits are realized by eliminating the need to utilize cover locking attachments as described above.

To maximize the drum content and handling the following drum preparation should be considered:

1) It is paramount to capitalize on the small-sizing raw material charged into the steel drum. This can be achieved by tamping or vibrating the drum content once charged. The air gaps/voids are filled by this process; consequently, the density significantly increases—the corollary effect of this increase is a reduction in the volume occupied by the drum content inside the drum. In other words, the freeboard height is increased. Consider the freeboard height to represent the distance from the top of the raw material surface in the drum to the top of the drum itself.

2) A steel cover or lid 11 with an outer diameter (OD) slightly smaller than the drum's inner diameter (ID) is placed inside the drum 12 and sits on-top of the drum content. The side wall of the drum in the freeboard area is folded/necked inwards 13 then the entire drum is hydraulically crushed in a press 14. This action moves the content towards a vacuum condition. This action further augments the finished products density and provides a secured cover as the side wall collapses onto the inside cover, 15 and 16, and acts as your locking mechanism. This cover configuration resolves the magnet-batched handling issues noted above.

Figure 2:
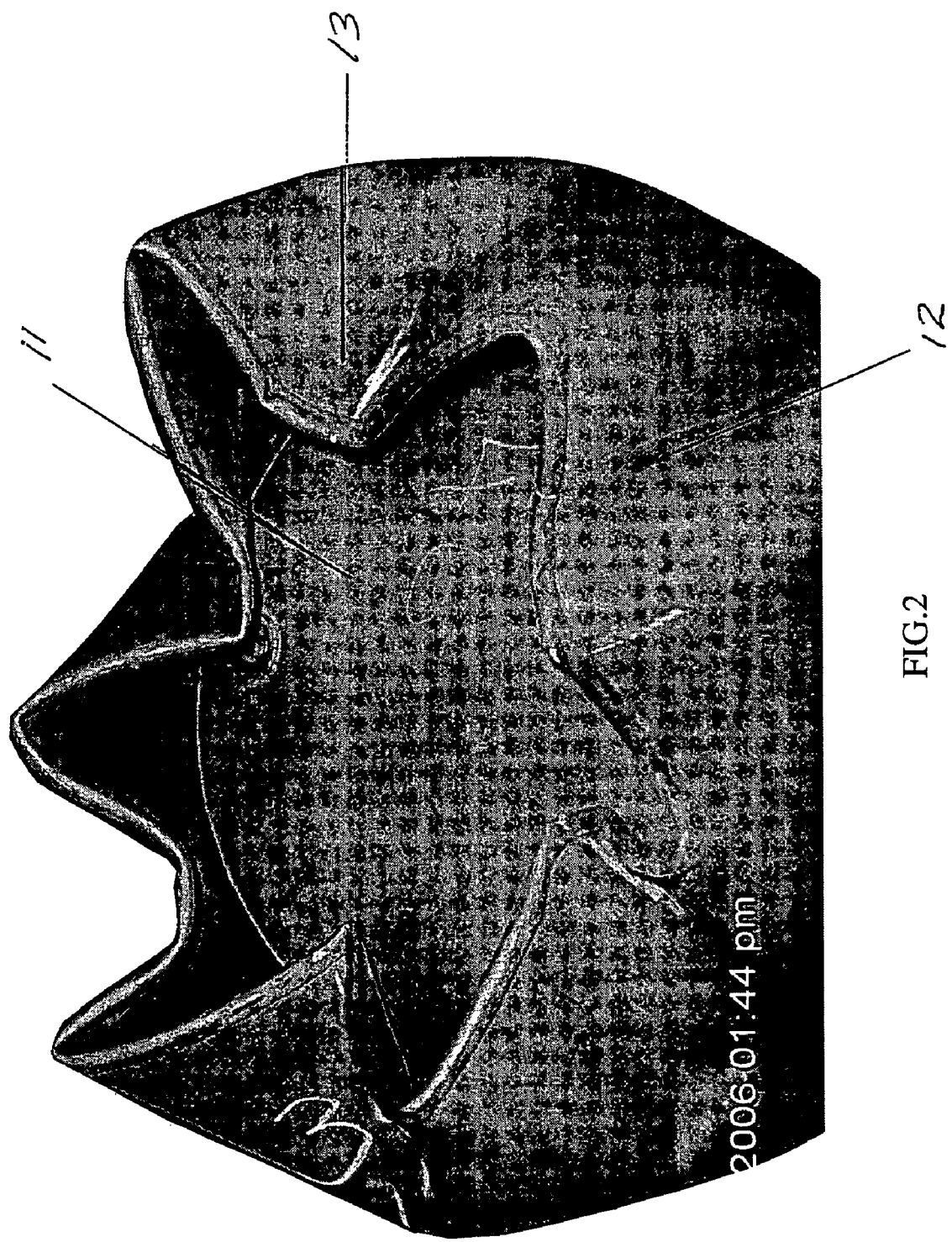
FIG. 2 is a photograph of a cover being placed inside the drum onto the drum contents. The side walls are folded/necked inwards in the freeboard area.
Figure 3:
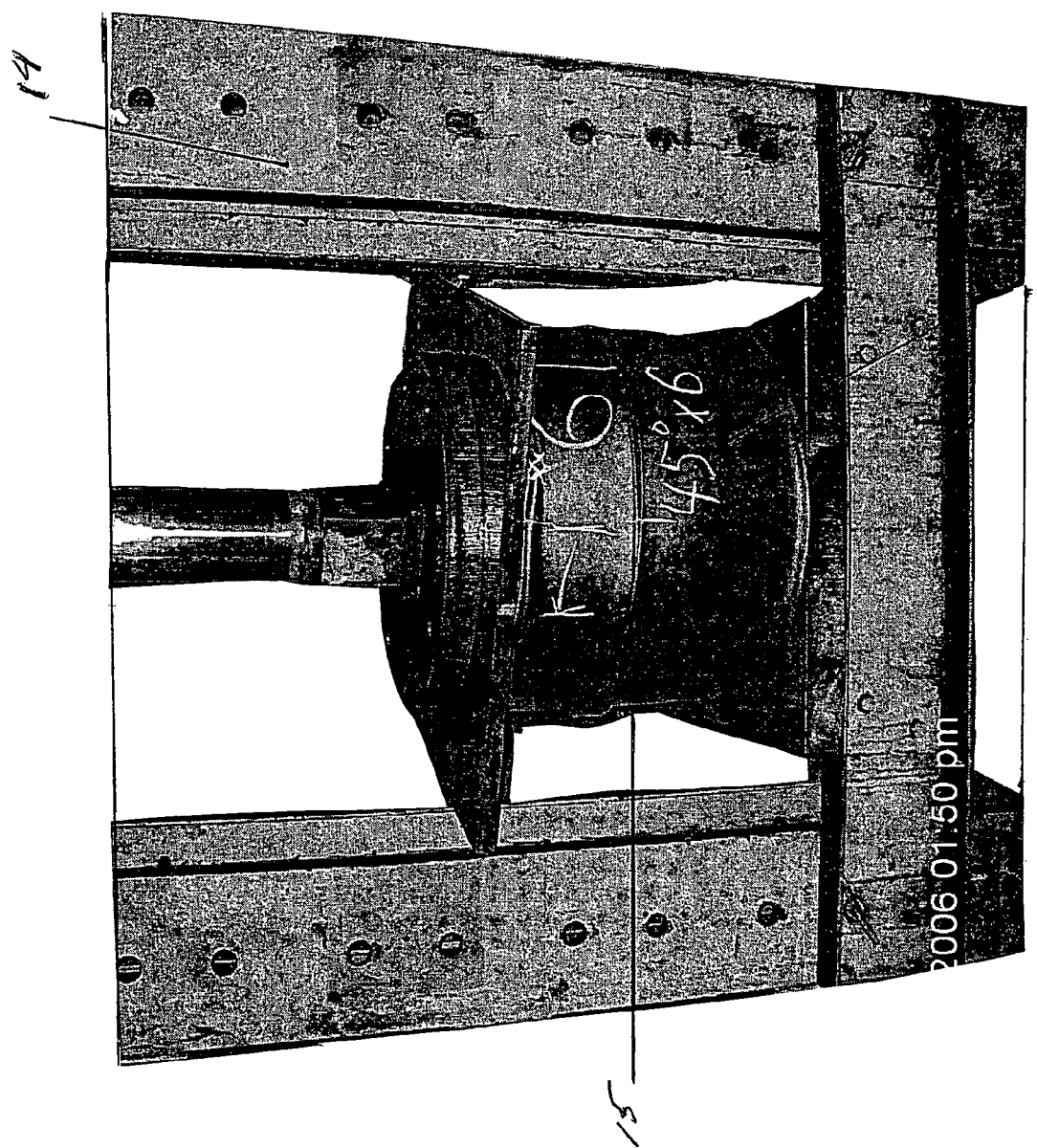
FIG. 3 is a photograph of a drum being hydraulically crushed.
Figure 4:
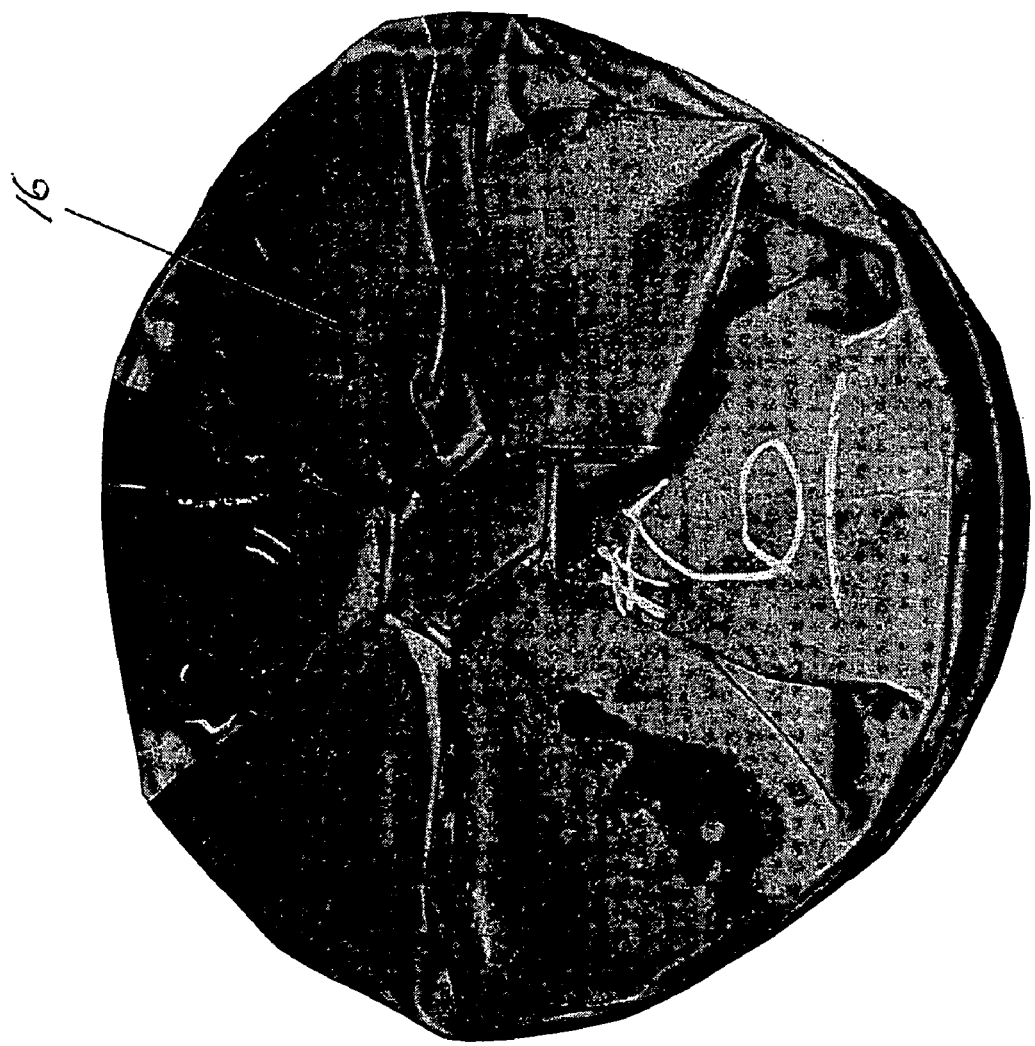
FIG. 4 is a photograph of drum side walls collapsed onto inner cover and acting as the locking mechanism

Please refer to FIGS. 2, 3 and 4.

Self Venting

In the above described drum preparation, an air-tight seal is not required to avoid spillage. The benefit by excluding the air-tight seal is the creation of a self-venting exit point. Any moisture or trapped air/gases can escape as the finished product is exposed to higher temperatures inside the melting unit.

Cost Per Ton

This type of product is typically sold on a cost per ton basis. Since the steel binder container can hold more raw materials by weight then one can expect a lower cost per ton.

This is the main priority or objective for processing the steel binder containers. It is a suitable substitute for current raw materials being charged but simultaneously it can be secured at a lower price. All of the other benefits such as, Higher Metallic Units since the binder is steel,
Ability to create Proprietary Blend-Mixes,
Ease of handling and the benefits associated with this,
Elimination of Rust during storage,
Higher Recovery Rates,
Alloying Flexibility,
Enhanced Chemical consistency and metal output,
Maximizing of Fuel Consumption, Less Coke usage due to simulated lower charge weight conditions, have been excluded at this point in the cost reduction calculations. Benefits realized from any of the above mentioned parameters are simply a bonus to reducing the cost per ton.

It will be understood that modifications can be made in the embodiments and method of the invention described herein.

I claim:

1. A process for reprocessing metallic and non-metallic by-products and melting the by-products comprising the steps of:
    (a) selecting an appropriate mix of by-products;
    (b) placing the selected by-products into a steel container wherein a melting point of the container is greater than a melting point of the selected by-products such that the selected by-products will melt prior to the container;
    (c) crushing the container to thereby encapsulate and mechanically seal the selected by-products within the container and so as to remove air from the container to reduce oxidation of the selected by-products and to move the contents of the container towards a vacuum condition; and
    (d) thereafter placing the container in a melting unit and heating the container to initially begin melting of the selected by-products and thereafter melting of the steel container.

2. The process of claim 1 further during the step of placing the encapsulated by-products into the vessel, the melting unit is selected from a group of melting units consisting of a cupola, electric arc and coreless furnaces, induction furnace and blast furnace.

3. The process of claim 1 further including a step of protecting the selected by-products from exposure to elements prior to introduction into the container.

4. The process of claim 1 wherein the melting point of the steel container is greater than 2600° F.

5. The process of claim 1 wherein the container is a steel drum and wherein after the selected by-products are placed within the drum a cover is placed over an open end of the drum and thereafter, sidewalls of the drum are collapsed to lock the cover over the selected by-products.

6. The process of claim 1 wherein the by-products are selected from a group of by-products consisting of steel shot fines, steel turnings, coke breeze, millscale, silicon carbide grains, ferrosilicon fines, silvery iron fines, and loose cast iron borings.

7. The process of claim 6 wherein the by-products are mixed with higher grade steel and cast iron scrap.

8. The process of claim 1 wherein the step of crushing to encapsulate and remove air is initiated immediately after the selected by-products are placed within the steel container and an opening in the container covered to thereby reduce oxidation caused by the by-products remaining exposed to moisture.

9. The process of claim 1 wherein after the selected by-products are placed within the steel container, the container is sealed in a manner to permit self-venting of gases from the container upon melting of the selected by-products therein.

10. The process of claim 1, wherein the selected by-products include small-sized steel by-products.

* * * * *